United States Patent [19]

Sampson

[11] Patent Number: 4,678,170

[45] Date of Patent: Jul. 7, 1987

[54] LOG HOLDER DEVICE

[76] Inventor: Robert L. Sampson, 901 W. 3rd, Anaconda, Mont. 59711

[21] Appl. No.: 852,620

[22] Filed: Apr. 16, 1986

Related U.S. Application Data

[63] Continuation of Ser. No. 643,773, Aug. 24, 1984, abandoned.

[51] Int. Cl.[4] .................................. B23Q 3/00

[52] U.S. Cl. .................................. 269/296; 269/901

[58] Field of Search .................... 269/45, 296, 901; 182/153, 154; 211/195, 198, 49.1, 60.1

[56] References Cited

U.S. PATENT DOCUMENTS

| | | | |
|---|---|---|---|
| 410,226 | 9/1889 | White | 211/195 |
| 1,484,164 | 2/1924 | Wickham | 182/153 |
| 2,585,523 | 2/1952 | Wellman | 211/49.1 |
| 2,653,347 | 9/1953 | Diekman | 269/296 |
| 3,148,746 | 9/1964 | Juculano | 182/153 |
| 4,039,064 | 8/1977 | Kirby | 269/296 |
| 4,268,020 | 5/1981 | Wood | 269/296 |
| 4,325,543 | 4/1982 | York | 269/296 |
| 4,362,295 | 12/1982 | Ford | 269/296 |
| 4,457,504 | 7/1984 | Mottla | 269/296 |
| 4,483,525 | 11/1984 | Thomas | 269/296 |
| 4,564,178 | 1/1986 | Steffe | 269/296 |

*Primary Examiner*—Robert C. Watson

*Attorney, Agent, or Firm*—Richard C. Conover

[57] ABSTRACT

An improved apparatus to be used by chain saw users, for example, for holding logs when cutting firewood. A portable log holder device is provided which enables a chain saw user to cut multiple logs into firewood pieces of the same length and at the same time prevent the chain saw from digging into the ground which might cause damage to the chain of the saw. The present invention includes a frame for holding logs above the ground surface. The logs being positioned generally horizontally, piled one on top of the other in a generally vertical direction. The frame is designed to be adjustable so that different log pieces can be sawed easily and is designed to make it difficult for the user to have the chain saw strike against the frame when being used.

2 Claims, 3 Drawing Figures

LOG HOLDER DEVICE

BACKGROUND OF INVENTION

This application is a continuation of application Ser. No. 643,773, filed Aug. 24, 1984 now abandoned.

This invention relates to a log holder which may be used by chain saw users, for example, to cut firewood. With the present device, a portable log holder is provided which enables a chain saw user to cut multiple logs into firewood pieces of the same length and at the same time prevents the chain saw from digging into the ground which might cause damage to the chain of the saw. Further, the present device is designed to enable a user to cut firewood quickly and with safety.

A power saw log bench is known such as described in British Pat. No. 2,065,538 to Styles et al. This patent describes a power log bench suitable for sawing logs with a chain saw. The device includes a bench having vertical members located thereon which prevent the log from rolling toward the user. With this device the logs are arranged on a generally horizontal plane. One of the problems with this device is that it is difficult for a user to cut very many logs at the same time, because the user would have to bend over the logs to be cut and this could be dangerous.

Other sawbuck devices are well known in the art such as described in the U.S. Pat. No. 3,034,546 to Parsons and U.S. Pat. No. 4,121,814 to Prior. These sawbuck devices are used for holding and cutting a single log.

Log cribs are also well known such as described in the March 1984 issue of the *Country Journal* at pages 14 and 15. These cribs are formed by driving stakes in the ground to form an enclosure and stacking the wood in the enclosure. A chain saw is then used to cut the wood in the crib to desired lengths.

SUMMARY OF INVENTION

The present invention is an improvement over the log benches and sawbuck devices now known in the art. The present invention is portable and can be easily set up to enable a chain saw user to cut multiple logs of any length with safety.

The present invention includes a frame for holding logs, which are positioned generally horizontally, piled one on top of the other in a generally vertical direction. The frame is designed to be adjustable so that different length log pieces can be sawed easily and is designed to make it difficult for a user to have the chain saw strike against the frame when being used. Further, the device is portable and can be collapsed by the user when it is desired to move the log holder device to another location.

The present device includes an "A" frame structure having a transversely positioned member located adjacent one end of a leg of the "A" frame. This member is further positioned in spaced apart relation with the ground when the "A" frame is in an upright and usable position. The frame includes multiple "A" frames, the number depending upon the length of the log to be cut and the length of the individual log pieces to be cut. The "A" frames are joined by a cross member and in a preferred embodiment a chain extends between the legs of the "A" frame so that the "A" frame does not extend to a position where use would be difficult or unsafe.

BRIEF DESCRIPTION OF THE DRAWINGS

In order that the invention may be clearly understood and readily carried into effect, a preferred embodiment will be described, by way of example only, with reference to the accompanying drawings wherein.

DESCRIPTION OF A PREFERRED EMBODIMENT

Figure 1:
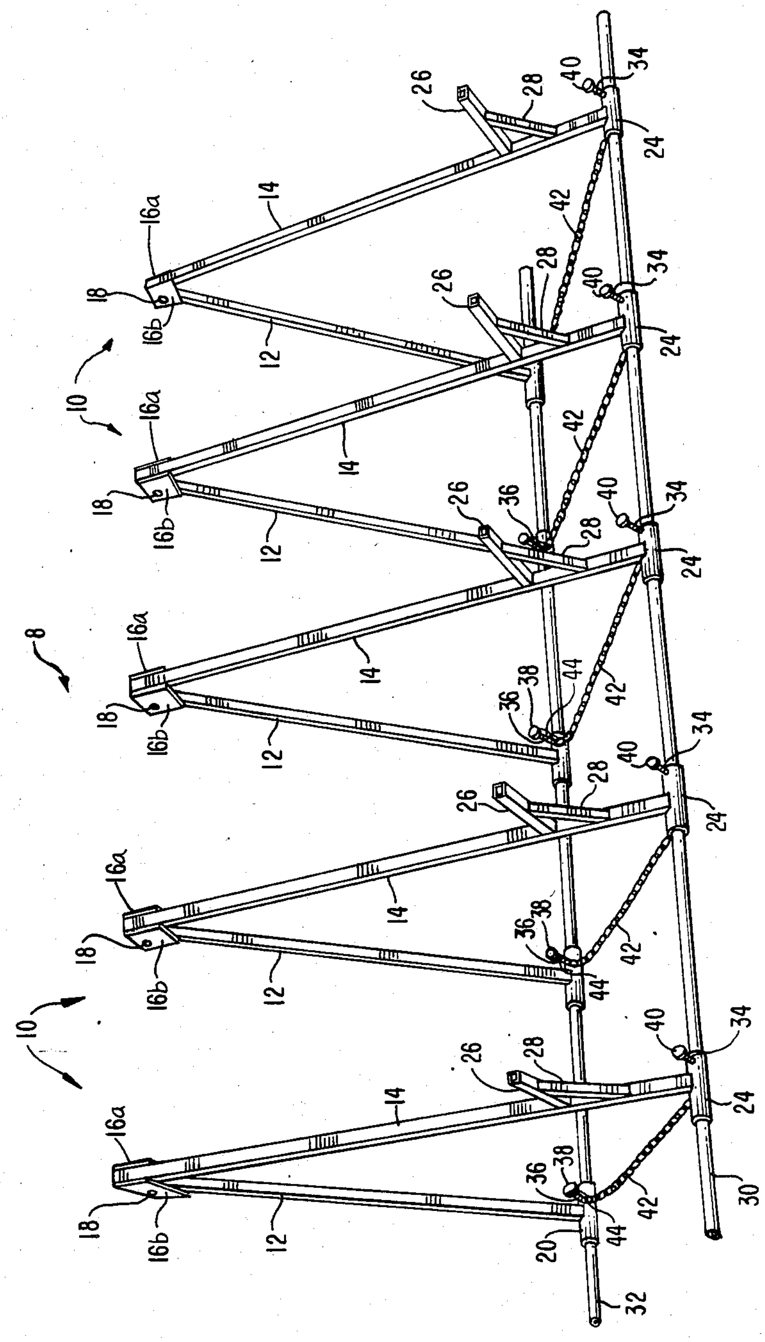
FIG. 1 is a generally front perspective view of the device according to the present invention.
Figure 2:
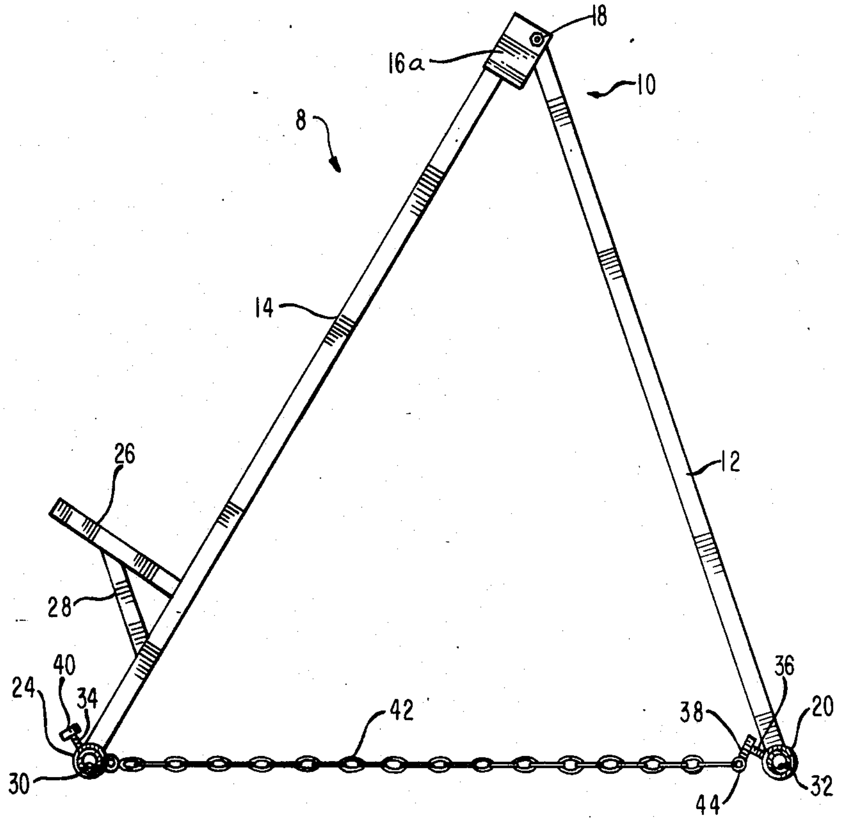
FIG. 2 is a right side perspective view of the log holder device as shown in FIG. 1.
Figure 3:
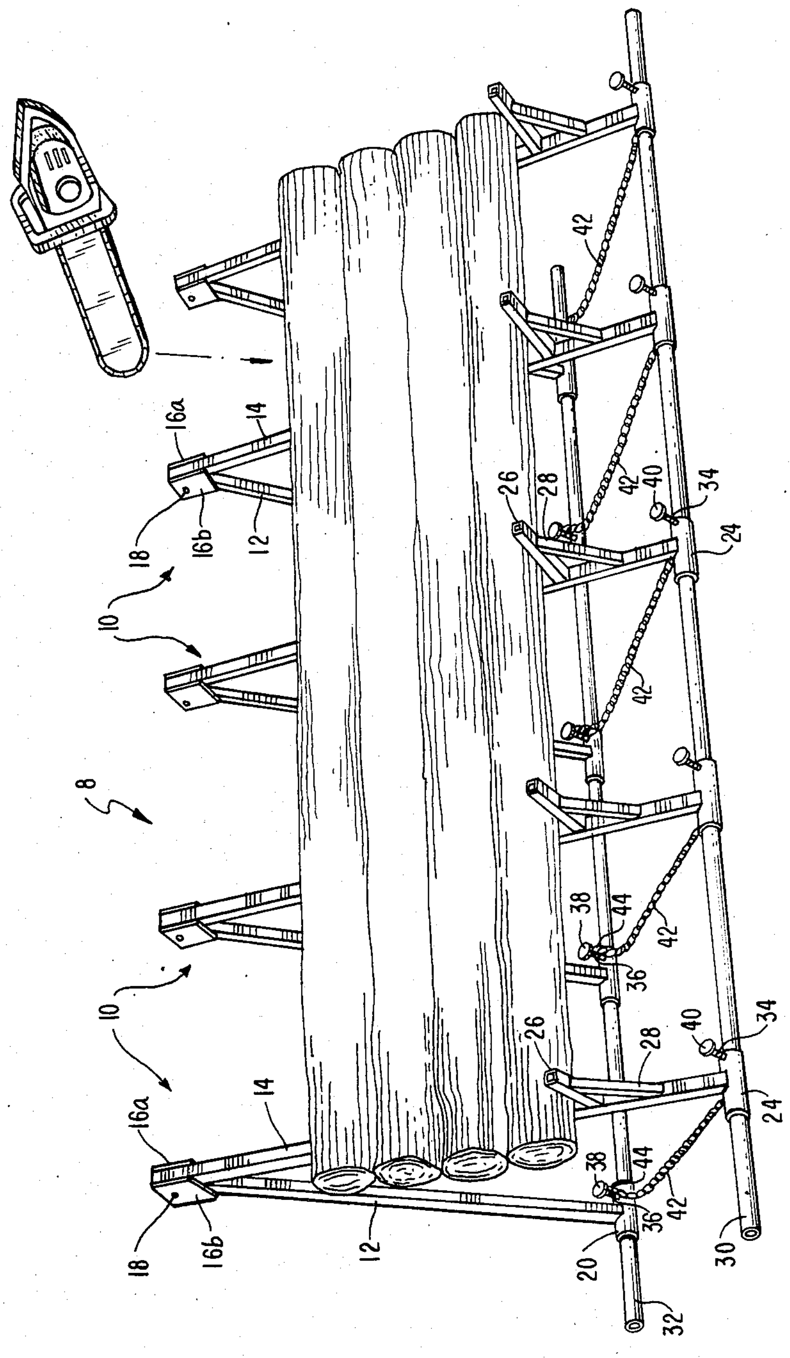
FIG. 3 is a front perspective view of the log holder device with logs positioned thereon for cutting and further shows a chain saw positioned to cut the logs according to the present invention.

The log holder 8 according to the present invention is shown in FIGS. 1–3 which includes an "A" frame 10 having rear legs 12 and a front leg 14. The leg 14 has at one end thereof two plates **16*a* and 16*b* mounted to the leg 14 in a spaced apart and parallel relation as shown in FIG. 1. The plates 16*a* and 16*b* each have a bore (not shown) aligned with one another. Through these bores entends a bolt 18 with a nut which acts as an axle as will be subsequently described. The leg 12 is provided with a bore (not shown) which also receives the bolt 18. The bolt extends through this bore when the leg 12 is positioned between plates 16*a* and 16*b*. The bolt 18 functions as an axle to permit pivoting of the leg 12 and 14 about the bolt 18. The location where the two legs 12 and 14 are joined with bolt 18 is the apex of the "A" frame 10**.

At the other end of the leg 12 opposite the apex of the "A" frame 10 is mounted a tubular member 20. The tubular member 20 is mounted to the leg 12, as by welding, and is positioned transversely to the leg 12 and in a direction generally perpendicular to the plane formed by the two legs 12 and 14 of the "A" frame 10.

A corresponding tubular member 24 similar to tubular member 20 is mounted to the lower portion of the leg 14 as shown in FIGS. 1 and 2. Again this tubular member 24 is mounted transversely to the longitudinal axis of leg 14 and is generally positioned in the direction perpendicular to the plane of the "A" frame.

Also mounted to the leg 14 is a log support member 26. This member 26 is mounted in a cantilever fashion to the leg 14 as by welding in a direction perpendicular to the axis of the leg 14 and generally in the same plane as the "A" frame as shown in FIGS. 1 and 2. The log member support member 26 is itself supported by a brace 28 as shown. The brace 28 extends between the leg 14 and the log support 26.

In using this device at least two "A" frames 10 must be used. In FIGS. 1 and 2, four "A" frames 10 are used. The number of "A" frames which are used depends upon the length of the logs to be cut. In using this device the logs are cut between the "A" frame members and thus it is possible to cut one more log piece than there are "A" frame members.

To support the "A" frames 10 in an upright position as shown in FIGS. 1 and 2, a front pipe 30 and a rear pipe 32 are used. These pipes are received by tubular members 20 and 24 as shown in FIG. 1 and the "A" frames are slidably moved on pipes 30 and 32 to the desired positions. The pipes 30 and 32 act as cross members which act to secure the "A" frames in a spaced apart and parallel relation. When the "A" frames are properly positioned, set screw 34 mounted on tubular member 24 and a corresponding set screw 36 provided on tubular member 20 are used to engage the respective pipes 30 and 32 to secure the "A" frames in the selected positions. The set screws 34 and 36 each have a handle portion 38 and 40 respectively.

In a preferred embodiment a chain 42 is used to limit the spacing between the free ends of the legs 12 and 14 of "A" frame 10 where tubular members 20 and 24 are located. One end of the chain is attached to the tubular members 24 as shown in FIG. 2. The other end of the chain 38 has a connector device 44 mounted thereto for releasably securing this end of the chain to the handle 38 mounted to set screw 34. The distance between the free ends of legs 12 and 14 can be changed by adjusting the position of the connector 44 on the chain 42. An additional advantage of using chain 42 is that with this chain the angle at the apex of the "A" frame 10 can be adjusted so that the apparatus can be used on sloping ground as well as fairly flat ground. When the apparatus is used on sloping ground, the angle of the apex is adjusted to be greater or less than the angle when the apparatus is used on flat ground so that the log support 26 extends slightly upwardly with respect to the horizontal to hold the logs placed on these log support members.

To use this device, a number of "A" frames 10 are selected depending upon the length of the logs to be cut and the number of pieces to be cut from each log. These "A" frames are then slid on to pipes 30 and 32. The "A" frames are then locked into place with set screws 34 and 36 after being positioned according to the number of pieces to be cut from the logs. After the "A" frames are secured in place, logs are stacked on the "A" frames as shown in FIG. 3. Preferably, the largest diameter log is on the bottom abutting the log support member 26 as shown. Additional logs are placed on top of one another with each succeeding by having the same or smaller diameter than the last log on the stack. Preferably all logs are positioned with the larger end at one end of the log holder.

Sawing is commenced preferably at the end of the log holder 8 at which the smallest ends of the logs are located. The chain saw is used by sawing from the top of the stack to the bottom between adjacent "A" frames 10 as shown in FIG. 3.

With this device multiple logs can be cut at once thereby saving much time in cutting firewood. Furthermore, since the logs are arranged in a generally vertical position the chain saw user does not have to bend over the work. The log support member 26 supports the lowest log above the ground which enables the chain saw user to cut through the logs without damaging the chain saw which might occur if the chain saw comes into contact with the ground. Further the frame is portable. By disassembling the frame and folding up the legs of the "A" frames 10, the entire frame can be easily moved to a new location. Finally, the frame is easy to assemble, easy to use and provides a safe method of cutting firewood.

There are many variations and modifications of the invention which are contemplated by the inventor. For example, the cross members formed by pipes 30 and 32 in the preferred embodiment could be replaced by fixed cross members. With this embodiment the distance between the "A" frames is not adjustable. Further, the chain 42 in the preferred embodiment could be replaced with a bar. In this embodiment, the angle of the "A" frame formed by rear leg 12 and front leg 14 would be fixed and not adjustable. In addition, the log support member 26 which is mounted to the leg 14 as by welding in the preferred embodiment could instead be hinged to the leg 14 so that the support member 26 could be collapsed when the log holder 8 is disassembled for moving to a new location. Further an extender member could be attached to the top of front leg 14 to enable a tall person to handle more logs at one time.

While the fundamental features of the invention have been shown and described it should be understood that various substitutions, modifications and variations may be made by those skilled in the art without departing from the spirit or the scope of the invention. Accordingly, all such modifications and variations are included within the scope of the invention as defined by the following claims.

I claim:

1. An improved device for holding logs and for facilitating the cutting of logs into pieces when the device is positioned on a base surface comprising:

(a) upright means including at least two upright members extending upwardly from the base surface, for holding multiple logs stacked one on top the other, such logs being arranged with their longitudinal axes in a generally parallel and horizontal direction;

(b) a log support member being mounted to each upright member such that the log support member extends outwardly from the upright member at an angle of 90° or less with respect to the upright member, the log support member being located in spaced apart relation with the base surface;

(c) means for holding the upright members in a spaced apart parallel relation, said means being located below the log support member;

(d) the upright members being constructed so that when the upright members are positioned for holding logs, the log support members extend in an upwardly direction with respect to the horizontal direction and the space above the log support members and the top of the upright members and between the upright members is free from any obstructions.

2. An improved device for holding logs, and for facilitating the cutting of logs into pieces when the device is positioned on a base comprising:

(a) at least two "A" frames each having a pair of legs pivotally joined at the apex, the frames being positioned in an upright manner and with the planes of the legs forming the "A" frames being arranged in a spaced apart and parallel relation;

(b) a log support member being mounted to a first leg of each "A" frame such that the log support member extends outwardly from the first leg in the same plane as the legs forming the "A" frame at an angle of 90° or less with respect to the first leg in the direction of the apex and being located in spaced apart relation with the base surface, the log support members being aligned to hold a log thereon;

(c) the "A" frames being constructed so that when the "A" frames are positioned for holding logs, the log support member extends in an upwardly direction with respect to the horizontal direction and the space above the log support members and the tops of the "A" frames and between the "A" frames is free from any obstructions; and (d) flexible connecting means having a selectable length for connecting the legs of each "A" frame at the end of each leg opposite the apex, whereby a user by adjusting the length of such means may maintain the angle of the log support member with respect to the horizontal even when the base surface is not horizontal.

* * * * *